United States Patent Office 3,324,958
Patented June 13, 1967

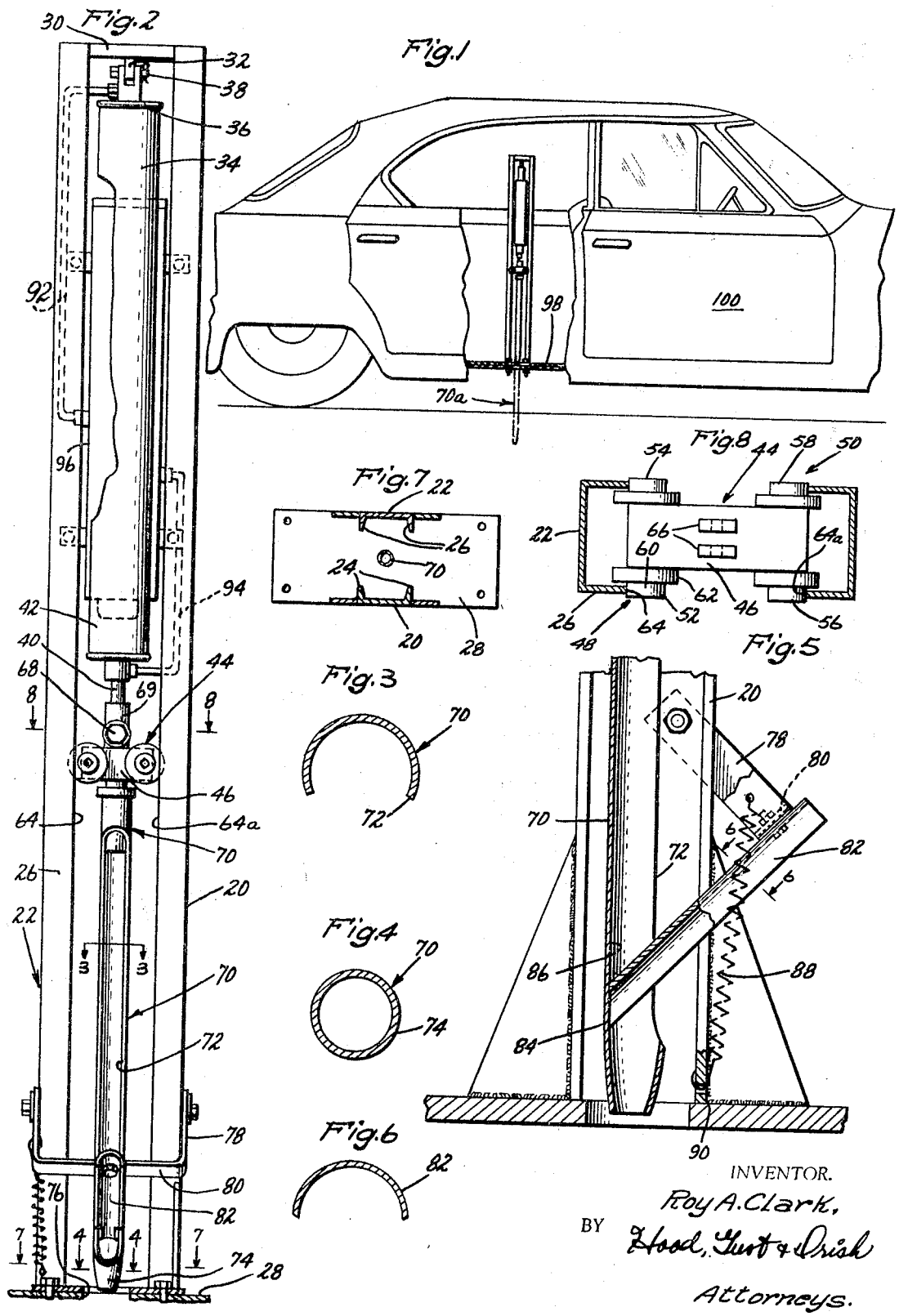

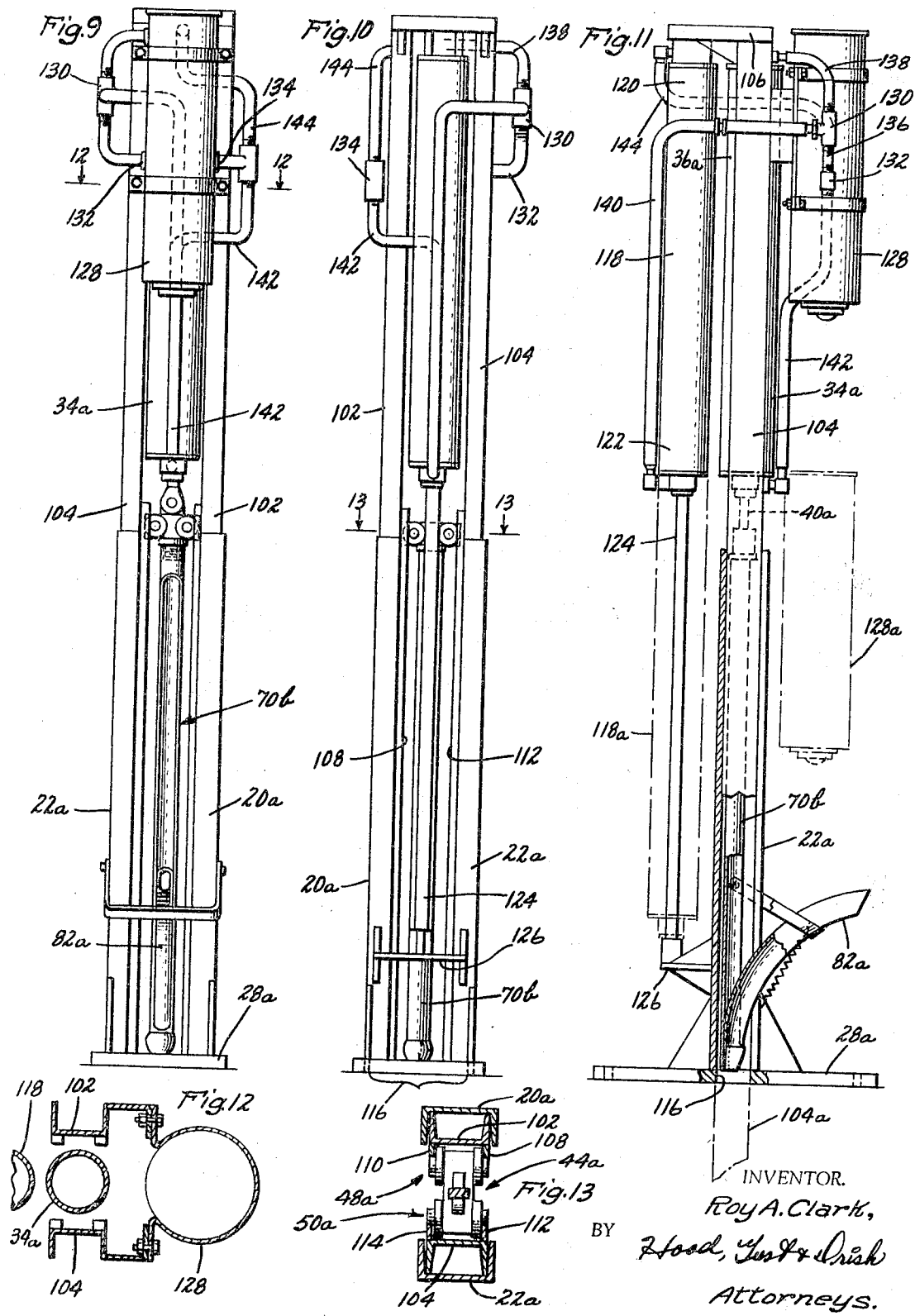

3,324,958
SOIL-SAMPLING APPARATUS WITH CORE
DISLODGING MEANS
Roy A. Clark, Fort Wayne, Ind.
(1213 Lillian St., Fort Atkinson, Wis. 53538)
Filed July 20, 1964, Ser. No. 383,625
12 Claims. (Cl. 175—84)

The present invention relates to soil-sampling apparatus and more particularly to power operated apparatus adapted to remove samples of soil from a selected area and deliver them to a predetermined location.

It is customary to take samples of soil from agricultural areas for the purpose of analyzing the content thereof and to determine whether or not any kind of treatment may be necessary. Soil analyses reveal deficiencies and excesses of certain chemicals such that it is possible to compensate for these by adding fertilizer to the soil in proper amounts, this fertilizer containing the necessary chemical ingredients.

In acquiring soil samples, it is customary to use a hand-operated auger or the like which is carried by an individual walking over the area to be tested. At spaced intervals, the person presses the auger or core member into the earth and lifts therefrom a sample of soil which is approximately six (6) inches deep. A conventional hand tool is simply a tubular member which is forced axially into the earth. A core of soil remains in the tube as the latter is withdrawn from the earth. This core is removed from the tube by some suitable means. Needless to say, the removal of such core is tedious and time-consuming, and quite often results in the damaging or loss of the soil sample.

The present invention relates to an apparatus whereby the taking of soil samples may be done expeditiously, reliably and efficiently. Also, it may be done entirely automatically. It is therefore an object of this invention to provide a soil-sampling apparatus which employs a unique and improved arrangement for obtaining soil samples and delivering them to a predetermined location.

It is another object of this invention to provide a soil-sampling apparatus which may be easily and conveniently mounted in a motor vehicle for taking soil samples.

It is yet another object of this invention to provide soil-sampling apparatus which is power driven and sufficiently powerful to take proper soil samples under conditions in which the soil may be soft or hard, and wet or dry.

It is yet another object of this invention to provide in a soil-sampling apparatus unique and improved equivalents for operating a soil probe for adequate distances and with sufficient power.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary side view of an ordinary automobile, partially broken away for clarity of illustration, showing one embodiment of the present invention mounted in the rear seat thereof in operating position;

FIG. 2 is a front elevational view of one embodiment of this invention;

FIG. 3 is a cross-section taken substantially along the section line 3—3 of FIG. 2;

FIG. 4 is a cross-section taken substantially along the section line 4—4 of FIG. 2;

FIG. 5 is an enlarged fragmentary view, partially sectioned longitudinally, of the lower end portion of the embodiment shown in FIG. 2;

FIG. 6 is a cross-section taken substantially along section line 6—6 of FIG. 5;

FIG. 7 is a cross-section taken substantially along section line 7—7 of FIG. 2;

FIG. 8 is a cross-section taken substantially along section line 8—8 of FIG. 2;

FIG. 9 is a front elevational view of another embodiment of this invention;

FIG. 10 is a rear view of the embodiment of FIG. 9;

FIG. 11 is a side view of the arrangement of the preceding FIGS. 9 and 10, partially longitudinally sectioned for clarity of illustration;

FIG. 12 is a cross-section taken substantially along section line 12—12 of FIG. 9; and FIG. 13 is a cross-section taken substantially along section line 13—13 of FIG. 10.

Referring to the drawings and more particularly to FIGS. 1 through 8, the apparatus there disclosed comprises two, elongated, straight and parallel frame members 20 and 22 which are channel-shaped in cross-section as shown more clearly in FIG. 7. These frame members 20 and 22 have flanges 24 and 26, respectively, which face inwardly toward each other. A steel foot plate 28 is welded to the lower extremities of the two frame members 20 and 22 and lies in a plane normal to the longitudinal axes thereof.

At the upper ends of the two members 20 and 22 is secured a horizontal bar 30 which has welded thereto a depending lug 32. A conventional, hydraulic power cylinder 34, which is double-acting, has its upper end 36 attached to the lug 32 by means of a suitable pivot pin 38. The power cylinder 34 may thereby be swingable and self-centering about this pin 38.

This power cylinder 34 carries the usual piston (not shown) having attached thereto a piston rod 40 which projects coaxially from the lower end 42 of the cylinder. To the lower or distal end of this piston rod 40 is pivotally attached a guide assembly indicated generally by the reference numeral 44. This guide assembly 44 is more clearly shown in FIGS. 2 and 8. It includes a body 46 consisting, in the present instance, of a block of suitable steel, having two pairs 48 and 50, respectively, of rollers mounted on the opposite body ends. The roller pair 48 includes rollers 52 and 54 while the roller pair 50 includes rollers 56 and 58. Since all four of these rollers are identically constructed, a description of one will suffice for all.

Considering the roller pair 48 first, the two rollers 52 and 54 are rotatably mounted on the body 46 for rotation about a common axis. The rollers 56 and 58 are similarly mounted on the body 46 for rotation about a common axis. Each roller, for example roller 52, is composed of two different diameter parts, the smaller part 60 being in engagement with the straight edge 64 of the flange 26 (FIG. 8) while the larger diameter portion 62 thereof overlies the inside of the flange 26 to thereby hold the guide assembly 44 against lateral movement. All four wheels 54, 56 and 58 are similarly constructed and engaged with the respective straight, elongated edge of the frame member flanges as just explained. Thus, the straight edges 64 of the two frame members 20 and 22 constitute guide rails for the rollers.

As shown in FIG. 2, the axes of the rollers pairs 48 and 50 lie in a horizontal plane, or in other words in a plane which is at right angles to the longitudinal axes of the frame members 20 and 22. As shown more clearly in FIG. 8, projecting upwardly from the upper surface of the body 46 are two lugs 66 which receive the lower end of the piston rod 40 therebetween (FIG. 2). A pivot pin 68 (FIG. 2) passes through the lugs 66 as a fitting 69 connected to the piston rod so as to attach the latter to the body 46. The pin 68 permits some swiveling movement or self-centering movement between the piston rod and the guide assembly 46 to prevent binding of the mechanism during operation. It should be noted that the axes of the two pins 38 and 68 extend at right angles to each other.

To the under side of the body 46 is secured the upper end of a straight, elongated, tubular steel probe indicated generally by the reference numeral 70. With the piston rod of the power cylinder 34 retracted fully to its illustrated position, the probe 70 is of such length that the lower extremity 74 thereof is disposed immediately above the foot plate 28 as shown in FIG. 2. This probe 70 is provided with an elongated, axially extending slot or opening 72 which extends from near the guide assembly 44 downwardly to near the lower extremity 74 of the probe 70. As shown more clearly in FIG. 3, the circumferential extent of this slot 72 is not quite half the circumference of the probe 70.

As will become apparent from the description that follows, this opening 72 needs to be of such size that soil cores can be retained inside the probe 70 without falling therefrom, but not so small that the soil cores cannot be removed laterally therefrom. In proportion to the circumference of the probe 70, the size of the opening 72 as shown in FIG. 3 is properly shown. The lower end 74 of the probe 70 is reduced in diameter and provided with a slight taper as is shown in FIGS. 2 and 4.

The foot plate 28 is provided with an opening 76 which receives the probe 70 therethrough with guiding clearance.

Pivotally mounted for swinging movement about a horizontal axis is a bracket 78 having a crossbar 80 to which a part-cylindrical finger or core-dislodging member 82 is secured. This finger 82 is straight and elongated and is inclined as shown with the lower end 84 thereof being engaged lightly with or spaced slightly from the rear inner wall 86 of the probe 70. The finger 82 extends through the slot 72. A tension spring 88 extends from the bracket 78 to the foot part 90 of the frame member 20 for urging the bracket 78 and the finger 82 clockwise and into operative engagement with the rear probe wall 86. FIG. 6 shows the cross-sectional shape of the finger 82, and FIGS. 5 and 6 together reveal the shape of the lower end 84 of the finger as it engages the rear wall 86 of the probe 70. Obviously, the end extremity 84 must be curved and conformed to the acuate shape of the wall 86 in order to provide for sliding engagement over the cross-sectional end area of the finger end 84.

As explained earlier, the power cylinder 34 is double-acting. This means that hydraulic fluid under pressure injected at end 36 will drive the piston rod 40 downwardly, and fluid under pressure injected at end 43 will drive the piston and piston rod 40 upwardly. A conduit for introducing pressure fluid to and exhausting fluid from the cylinder end 36 is indicated by the numeral 92. A similar conduit for admitting pressure fluid to and exhausting fluid from the cylinder end 42 is indicated by the numeral 94. These two conduits 92 and 94 lead to a conventional operating valve and hydraulic pump indicated generally by the reference numeral 96.

The mechanism shown in FIG. 2 and thus far described is illustrated in FIG. 1 as being mounted on the rear floorboards 98 of an automobile 100. Suitable bolts are used to mount the foot plate 28 onto the floorboards 98 so as to maintain the mechanism in an upright position as shown.

In operation, the automobile 100 is driven to an area where soil samples are to be taken. Once the automobile is positioned over an area where samples are to be taken, it is stopped. During this time, the probe 70 is retracted to the position shown in FIG. 2. The pump and valve mechanism indicated by the numeral 96 is now operated whereupon fluid under pressure is injected into the top end of the cylinder 36 via the conduit 92. This forces the piston and the piston rod 40 downwardly, the guide assembly 46 as well as the probe 70 also being forced axially downwardly. The roller pairs 48 and 50 are guided in the straight vertical line by reason of the engagement thereof with the flange edges of the frame members 20 and 22 such that the probe 70 is moved axially only. Also, the opening 76 in the foot plate 28 is made to such size as to limit any sideways motion of the probe 70.

When the piston in the cylinder 34 is fully extended, the probe is moved downwardly to the position indicated by the numeral 70a shown in FIG. 1. In a working embodiment of this invention, the probe will penetrate the soil to a depth of from about six (6) to eight (8) inches. As the lower probe end enters the soil, a core of soil moves upwardly internally thereof.

Once the probe has been moved downwardly to its fullest extent, or to the extent desired, the power cylinder 34 is operated oppositely by injecting pressure fluid into the lower end 42 of the power cylinder. This lifts the piston rod 40 as well as the probe 70, the core of soil inside the probe being lifted therewith.

As the upper end of the soil core engages the end 84 of the finger 82, the latter acts as a deflector and directs the soil core outwardly of the probe 70 through the slot 72. A pan placed next to the soil probe and beneath the finger 82 can be used to catch this dislodged soil core.

The operation just described is repeated for different soil samples taken at different areas and as will be obvious to a person skilled in the art can be entirely automatic in response to the operator pressing a button or turning a key.

A slightly different working embodiment of the invention is illustrated in FIGS. 9 through 14. In this connection, like numerals with the suffix letter added will indicate like parts. As shown more clearly in FIGS. 9 through 11, the members 20a and 22a are about half as long as the counterpart members 20 and 22 of FIG. 2. These frame members 20a and 22a in this second embodiment may be regarded as stationary frame members. Fitted into the stationary members 20a and 22a are a pair of movable frame members 102 and 104, respectively, which are about twice as long as the members 20a and 22a and are also straight and parallel. These members 102 and 104 are channel-shaped in cross-section and are of such size as to be fitted slidably between the flanges of the two members 20a and 22a as shown more clearly in FIG. 13. The flanges of these two members 102 and 104 face oppositely and engage the bottom wall of the two members 20a and 22a, as shown, such that the members 20a and 22a serve as guides for rectilinear vertical movement of the movable members 102 and 104.

The power cylinder 34a is secured at its upper end to an upper plate 106 secured to the upper ends of the two members 102 and 104. The power cylinder 34a is thereby positioned between and in parallelism with the movable members 102 and 104, the same as the cylinder 34 with respect to its members 20 and 22.

As shown more clearly in FIGS. 9, 10, 12 and 13, elongated, straight steel bars 108, 110, 112 and 114 are welded or otherwise secured to the facing sides of the movable members 102 and 104. These members 108, 110, 112 and 114 are upright and parallel and are spaced apart so as to be engaged by the roller pairs 48a and 50a as shown. These rails 108, 110, 112 and 114 are about half as long as the movable members 102 and 104 as shown in FIGS. 9 and 10.

By reason of the engagement of the members 102 and 104 with the members 20a and 22a, respectively, and of the roller pairs 48a and 50a with the rails 108, 110, 112 and 114, the guide assembly 44a as well as the piston rod and probe connected thereto can move only rectilinearly vertically.

The probe 70b may be constructed identically to the probe 70 and attached to the guide assembly 44a in the same manner. The core-dislodging mechanism, however, may be arranged such that the finger 82a instead of being straight as the finger 82 is curved as shown more clearly in FIG. 11. Otherwise, the core dislodging mechanism is the same as and similarly positioned with respect to the probe as the arrangement of FIG. 2.

The floor plate 28a, as shown more clearly in FIGS. 10 and 11, has an opening 116 large enough to receive with some clearance therethrough the movable members 102 and 104 as well as the probe 70b.

A second power cylinder 118 is disposed in parallelism alongside the first power cylinder 34a and is also double-acting. The upper end 120 of this power cylinder 118 is secured to the upper plate 106 as shown more clearly in FIG. 11. The lower end 122 which is disposed adjacent to and alongside of the lower end of the cylinder 34a has extending therefrom a piston rod 124 which is connected in the usual manner to a piston (not shown) inside the cylinder 118. The lower end of the piston rod 124 is secured to a suitably strong bracket 126 which is in turn secured to the two stationary members 20a and 22a. In the position of the apparatus shown in FIG. 11, the piston rod 124 of the power cylinder 118 is fully extended while the piston rod 40a of the power cylinder 34a is fully retracted. The probe 70b is situated just slightly above the floor plate 28a. Both of the power cylinders 34a and 118 are preferably hydraulic and double-acting.

A conventional hydraulic pump and motor combination 128 is mounted on the movable members 102 and 104 as shown more clearly in FIGS. 11 and 12 and has connections leading to the two cylinders 34a and 118.

Since the mechanism has two directions of operation, i.e., upward and downward, it is necessary for the hydraulic mechanism to be able to work oppositely. This operation is permitted by reason of the fact that the pump 128 has two outlets 132 and 134 on opposite sides thereof which are selectively inputs and outputs of the pumping system. For operating the probe 70b downwardly, the hydraulic system involved leads from the pump connection 132 through a pipe T 130, the conduit 136 and through the conduit 138 which connects to the upper end of the cylinder 34a. Also, a line 140 connects the T 130 to the bottom end of the cylinder 118. Thus, pressure fluid delivered by the pump 128 will reach the upper end of the power cylinder 34a and drive the piston rod 40a downwardly. This same pressure fluid flows through the conduit 140 to the bottom end of the cylinder 122. This serves to force the piston rod 124 upwardly.

The reversing system involves the pump connection 134 which is connected to two different lines 142 and 144, line 142 connecting to the lower end of cylinder 34a and line 144 connecting to the upper end of cylinder 118. Pressure fluid injected at the lower end of cylinder 34a raises the piston rod 40a while the same pressure fluid injected at the top of power cylinder 118 extends the piston rod 124.

If it is desired to operate only the power cylinder 34a, suitable valving (not shown) is so manipulated so as to disable cylinder 118 to permit the free movement thereof. Pressure fluid flows from the pump 128 to the top end of the cylinder 34a which results in driving the piston rod 40a downwardly and with it the probe 70b. The guide assembly 44a insures that this movement will be truly vertical and rectilinear. Upon reverse operation, pressure fluid is introduced at the lower end of the power cylinder 34a, thereby retracting the piston rod 40a and the probe 70b. Any soil core inside the probe 70b is deflected or dislodged to one side by the curved finger 82a.

In the second mode of operation, the power cylinder 118 operates simultaneously with the power cylinder 34a. For protracting the probe 70b, the system is so operated as to connect the lower end 122 of cylinder 118 and the upper end of the cylinder 34a to the pressure side of the pump 128. This results in the piston rod 124 retracting and the piston rod 40a protracting. Retraction of the piston rod 124 moves the two members 102 and 104 downwardly, carrying with them the power cylinder 34a as well as the probe 70b. As the piston rod 40a extends, relative movement will be produced between the probe 70b and the movable members 102 and 104 which results in the probe 70b protracting ahead of the movable members. Thus, the two power cylinders 34a and 118 operate in unison in driving the probe 70b downwardly into the soil. Retraction of the probe 70b is brought about by reversal of the flow to the two cylinders 34a and 118, this flow extending to the upper end 120 of the cylinder 118 and to the lower end of the cylinder 34a. As the probe 70b is retracted, the dislodging finger 82a operates as previously explained.

In FIG. 11, the dashed line configuration 118a indicates the position of the power cylinder 118 when the latter has been fully operated to protract the movable members 102 and 104. The protracted position of the member 104 is indicated by the numeral 104a. Also, the protracted position of the pump 128 is indicated by the dashed line shape 128a.

While there have been described above the principles of this invention in connection with specific apparatus, it is to be clearly understood that this description is made only by way of example and not as a limitation to the scope of the invention.

I claim:

1. A soil-sampling apparatus comprising a pair of spaced-apart upstanding frame members of channel shaped cross-section, said members being parallel and the flanges of one member extending toward and being spaced from the flanges of the other member, said flanges having upright, straight and parallel edges, a power cylinder having a piston rod projecting from one end, said power cylinder being disposed between and in parallelism with said members adjacent to the upper end portions of said members, means securing the other end of said power cylinder to the upper ends of said members such that said cylinder depends therebetween with said piston rod extending downwardly between said members in parallelism therewith, means carried by said members for selectively actuating said power cylinder and reciprocating said piston rod; a guide assembly comprising a body having two pairs of guide rolers mounted thereon, each pair of guide rollers including two spaced apart rollers rotatable about a common axis, the axes of said pairs being parallel and spaced apart; said guide assembly being disposed between said members with the roller axes thereof being in a plane normal to the longitudinal axis of said members, one pair of rollers having rolling engagement with the two edges of the flanges of one member so as to be movable vertically thereon, the other pair of rollers having rolling engagement with the two edges of the flanges of the other member so as to be movable vertically thereon, the distal end of said piston rod being secured to said assembly body such that reciprocation of said piston rod produces corresponding vertical movement of said assembly; a tubular soil probe secured at one end to said body to depend from the latter in parallelism with and between said members, a foot plate secured to the lower extremities of said members and having a guiding opening therethrough which receives said probe, said probe having an elongated, axially extending opening on one side thereof which terminates short of the lower extremity of said probe, said lower extremity of said probe being located just above said foot plate when said power cylinder is fully retracted, a core-dislodging finger extending through said elongated opening and having one end disposed adjacent to the inner wall of said probe opposite said elongated opening, said finger being inclined upwardly from said one end thereof, a bracket pivotally mounted on said members for swinging movement about a horizontal axis, said finger being fixedly secured to said bracket, a tension spring connected at one end to said bracket and at the other end to one of said members for urging said one finger end toward said inner wall, said one finger end being positioned adjacent to the lower probe end when said piston rod is fully retracted, thereby serving to dislodge soil cores from said probe upon upward movement thereof.

2. A soil-sampling apparatus comprising a pair of spaced-apart upstanding frame members of channel shaped cross-section, said members being parallel and the flanges of one member extending toward and being spaced from the flanges of the other member, said flanges having upright, straight and parallel edges, a power cylinder having a piston rod projecting from one end, said power cylinder being disposed between and in parallelism with said members adjacent to the upper end portions of said members, means securing the other end of said power cylinder to the upper ends of said members such that said cylinder depends therebetween with said piston rod extending downwardly between said members in parallelism therewith, means carried by said members for selectively actuating said power cylinder and reciprocating said piston rod; a tubular soil probe disposed between and in parallelism with said members, means securing the upper end of said probe to said piston rod for vertical reciprocatory movement therewith, a foot plate secured to the lower extremities of said members and having a guiding opening therethrough which receives said probe, said probe having an elongated, axially extending opening on one side thereof which terminates short of the lower extremity of said probe, said lower extremity of said probe being located just above said foot plate when said power cylinder is fully retracted, a core-dislodging finger extending through said elongated opening and having one end disposed adjacent to the inner wall of said probe opposite said elongated opening, said finger being inclined upwardly from said one end thereof, a bracket pivotally mounted on said members for swinging movement about a horizontal axis, said finger being fixed secured to said bracket, a tension spring connected at one end to said bracket and at the other end to one of said members for urging said one finger end toward said inner wall, said one finger end being positioned adjacent to the lower probe end when said piston rod is fully retracted, thereby serving to dislodge soil cores from said probe upon upward movement thereof.

3. A soil-sampling apparatus comprising a pair of spaced-apart upstanding frame members of channel shaped cross-section, said members being parallel and the flanges of one member extending toward and being spaced from the flanges of the other members, said flanges having upright, straight and parallel edges, a guide assembly comprising a body having two pairs of guide rollers mounted thereon, each pair of guide rollers including two spaced-apart rollers rotatable about a common axis, the axes of said pairs being parallel and spaced apart; said guide assembly being disposed between said members with the roller axes thereof being in a plane normal to the longitudinal axis of said members, one pair of rollers having rolling engagement with the two edges of the flanges of one member so as to be movable vertically thereon, the other pair of rollers having rolling engagement with the two edges of the flanges of the other member so as to be movable vertically thereon, means connected to said guide assembly for moving the latter vertically; a tubular soil probe secured at one end to said body to depend from the latter in parallelism with and between said members, a foot plate secured to the lower extremities of said members and having a guiding opening therethrough which receives said probe, said probe having an elongated, axially extending opening on one side thereof which terminates short of the lower extremity of said probe, a core-dislodging finger extending through said elongated opening and having one end disposed adjacent to the inner wall of said probe opposite said elongated opening, said finger being inclined upwardly from said one end thereof, a bracket pivotally mounted on said members for swinging movement about a horizontal axis, said finger being fixedly secured to said bracket, a tension spring connected at one end to said bracket and at the other end to one of said members for urging said one finger end toward said inner wall, said one finger end being positioned adjacent to the lower probe end when said probe is fully elevated thereby serving to dislodge said cores from said probe upon upward movement thereof.

4. A soil-sampling apparatus comprising a frame, a tubular soil probe movably mounted on said frame, means on said frame for selectively axially and vertically reciprocating said probe, said probe having an elongated, axially extending opening on one side thereof which terminates short of the lower extremity of said probe, said elongated opening having a circumferential dimension approximating but less than one-half the circumference of said probe whereby a soil core can be removed from said probe through said opening, a core-dislodging finger extending through said elongated opening and having one end disposed adjacent to the inner wall of said probe opposite said elongated opening, said finger being inclined upwardly from said one end thereof, and means for mounting said finger on said frame.

5. A soil-sampling apparatus comprising a frame, a tubular soil probe movably mounted on said frame, means on said frame for selectively axially and vertically reciprocating said probe, said probe having an elongated axially extending opening on one side thereof which terminates short of the lower extremity of said probe, said elongated opening having a circumferential dimension whereby a soil core can be removed from said probe through said opening, and means extending through said opening into said probe for dislodging soil cores therethrough in response to upward movement of said probe.

6. A soil-sampling apparatus comprising a first pair of spaced apart upstanding frame members of channel-shaped cross-section, said members being parallel and the flanges of one member extending toward and being spaced from the flanges of the other member, a second pair of spaced apart upstanding frame members of channel-shaped cross-section, said second members being longer than said first members, said second members slidably fitted within said first members, respectively, for vertical movement, said second members being disposed with the flanges thereof extending oppositely away from each other, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, said second members each having a pair of vertical, parallel guide rails thereon which are spaced horizontally, the guide rails of each second member extending inwardly toward the other second member; a guide assembly comprising a body having two pairs of guide rollers mounted thereon, each pair of guide rollers including two spaced apart rollers rotatable about a common axis, the axes of said pairs being parallel and spaced horizontally apart, said guide assembly being disposed between said second members with the roller axes thereof being in a plane normal to the longitudinal axes of said first and second members, one pair of rollers having rolling engagement with one pair of guide rails, the other pair of rollers having rolling engagement with the other pair of guide rails, the lower end of said piston rod being secured to said assembly body such that reciprocation of said piston rod produces corresponding vertical movement of said assembly on said guide rails, a tubular soil probe secured at one end to said body to depend from the latter in parallelism with and between said first and second members, a foot plate secured to the lower extremities of said first members and having an opening therethrough which receives said second members and said probe, said probe having an elongated, axially extending opening on one side thereof which terminates short of the lower extremity of said probe, a core-dislodging finger extending through said elongated opening and having one end disposed adjacent to the inner wall of said probe opposite said elongated opening, said finger being inclined upwardly from said one end thereof, a bracket pivotally mounted on said first members for swinging movement about a horizontal axis, said finger being fixedly secured to said bracket, a tension spring connected at one end to said bracket and at the other end to one of said first members for urging said one finger end toward said inner wall, said one finger end being positioned adjacent to the lower probe end when said piston rod is fully retracted thereby serving to dislodge soil cores from said probe upon upward movement thereof, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly, and means for protracting and retracting simultaneously said first and second power cylinders, respectively.

7. A soil-sampling apparatus comprising a first pair of spaced-apart upstanding frame members of channel-shaped cross-section, said members being parallel and the flanges of one member extending toward and being spaced from the flanges of the other member, a second pair of spaced apart upstanding frame members of channel-shaped cross-section, said second members being longer than said first members, said second members being slidably fitted within said first members, respectively, for vertical movement, said second members being disposed with the flanges thereof extending oppositely away from each other, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, said second members each having a pair of vertical, parallel guide rails thereon which are spaced horizontally, the guide rails of each second member extending inwardly toward the other second member; a guide assembly comprising a body having two pairs of guide rollers mounted thereon, each pair of guide rollers including two spaced-apart rollers rotatable about a common axis, the axes of said pairs being parallel and spaced horizontally apart, said guide assembly being disposed between said second members with the roller axes thereof being in a plane normal to the longitudinal axis of said members, one pair of rollers having rolling engagement with one pair of guide rails, the other pair of rollers having rolling engagement with the other pair of guide rails, the lower end of said piston rod being secured to said assembly body such that reciprocation of said piston rod produces corresponding vertical movement of said assembly on said guide rails, a tubular soil probe secured at one end to said body to depend from the latter in parallelism with and between said members, a foot plate secured to the lower extremities of said first members and having an opening therethrough which receives said second members and said probe, said probe having an elongated, axially extending opening on one side thereof which terminates short of the lower extremity of said probe, means for dislodging said cores from said probe in response to upward movement of the latter, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly, and means for protracting and retracting simultaneously said first and second power cylinders, respectively.

8. A soil-sampling apparatus comprising a first pair of spaced-apart upstanding frame members, said members being parallel, a second pair of spaced-apart upstanding frame members of channel-shaped cross-section, said second members being longer than said first members, said second members being slidably fitted onto said first members, respectively, for vertical movement, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, said second members each having a pair of vertical, parallel guide rails thereon which are spaced horizontally, the guide rails of each second member extending inwardly toward the other second member; a guide assembly comprising a body having two pairs of guide rollers mounted thereon, each pair of guide rollers including two spaced apart rollers rotatable about a common axis, the axes of said pairs being parallel and spaced horizontally apart, said guide assembly being disposed between said second members with the roller axes thereof being in a plane normal to the longitudinal axis of said members, one pair of rollers having rolling engagement with one pair of guide rails, the other pair of rollers having rolling engagement with the other pair of guide rails, the lower end of said piston rod being secured to said assembly body such that reciprocation of said piston rod produces corresponding vertical movement of said assembly on said guide rails, a tubular soil probe secured at one end to said body to depend from the latter in parallelism with and between said members, a foot plate secured to the lower extremities of said first members and having an opening therethrough which receives said second members and said probe, said probe having an elongated, axially extending opening on one side thereof which terminates short of the lower extremity of said probe, a core-dislodging finger extending through said elongated opening and having one end disposed adjacent to the inner wall of said probe opposite said elongated opening, said finger being inclined upwardly from said one end thereof, a bracket pivotally mounted on said first members for swinging movement about a horizontal axis, said finger being fixedly secured to said bracket, a tension spring connected at one end to said bracket and at the other end to one of said first members for urging said one finger end toward said inner wall, said one finger end being positioned adjacent to the lower probe end when said piston rod is fully retracted thereby serving to dislodge soil cores from said probe upon upward movement thereof, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly, and means for protracting and retracting simultaneously said first and second power cylinders, respectively.

9. A soil-sampling apparatus comprising a first pair of spaced apart upstanding frame members, said members being parallel, a second pair of spaced apart upstanding frame members of channel-shaped cross-section, said second members being longer than said first members, said second members being slidably fitted onto said first members, respectively, for vertical movement, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, said second members each having a pair of vertical, parallel guide rails thereon which are spaced horizontally, the guide rails of each second member extending inwardly toward the other second member; a guide assembly comprising a body having two pairs of guide rollers mounted thereon, each pair of guide rollers including two spaced apart rollers rotatable about a common axis, the axes of said pairs being parallel and spaced horizontally apart, said guide assembly being disposed between said second members with the roller axes thereof being in a plane normal to the longitudinal axis of said members, one pair of rollers having rolling engagement with one pair of guide rails, the other pair of rollers having rolling engagement with the other pair of guide rails, the lower end of said piston rod being secured to said assembly body such that reciprocation of said piston rod produces corresponding vertical movement of said assembly on said guide rails, a tubular soil probe secured at one end to said body to depend from the latter in parallelism with and between said members, a foot plate secured to the lower extremities of said first members and having an opening therethrough which receives said second members and said probe, said probe having an elongated, axially extending opening on one side thereof which terminates short of the lower extremity of said probe, means for dislodging soil cores from said probe in response to upward movement of the latter, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly, and means for protracting and retracting simultaneously said first and second power cylinders, respectively.

10. A soil-sampling apparatus comprising a first pair of spaced apart upstanding frame members, said members being parallel, a second pair of spaced apart upstanding frame members of channel-shaped cross-section, said second members being longer than said first members, said second members being slidably fitted onto said first members, respectively, for vertical movement, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, a tubular upright soil probe disposed between said second members in parallelism therewith, means securing the upper end of said probe to said piston rod for vertical movement therewith, said probe having an elongated, axially extending opening on one side thereof which terminates short of the lower extremity of said probe, a core-dislodging finger extending through said elongated opening and having one end disposed adjacent to the inner wall of said probe opposite said elongated opening, said finger being inclined upwardly from said one end thereof, a bracket pivotally mounted on said first members for swinging movement about a horizontal axis, said finger being fixedly secured to said bracket, a tension spring connected at one end to said bracket and at the other end to one of said first members for urging said one finger end toward said inner wall, said one finger end being positioned adjacent to the lower probe end when said piston rod is fully retracted thereby serving to dislodge soil cores from said probe upon upward movement thereof, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly, and means for protracting and retracting simultaneously said first and second power cylinders, respectively.

11. A soil-sampling apparatus comprising a first pair of spaced apart upstanding frame members, said members being parallel, a second pair of spaced apart upstanding frame members of channel-shaped cross-section, said second members being longer than said first members, said second members being slidably fitted onto said first members, respectively, for vertical movement, a first power cylinder disposed between the upper end portions of said second members in parallelism therewith, means securing the upper end of said first cylinder to the upper ends of said second members, said first cylinder having a reciprocable piston rod extending downwardly therefrom in parallelism with said second members, a tubular upright soil probe disposed between said second members in parallelism therewith, means securing the upper end of said probe to said piston rod for vertical movement therewith, said probe having an elongated, axially extending opening on one side thereof which terminates short of the lower extremity of said probe, means for dislodging soil cores from said probe in response to upward movement of the latter, a second power cylinder disposed parallel to and alongside said first power cylinder, means securing the upper end of said second cylinder to the upper ends of said second members, said second cylinder having a vertically reciprocable piston rod extending from the lower end thereof in parallelism with said first piston rod, means securing the lower end of said second piston rod to said first frame members whereby retractile movement of said second cylinder moves said second members downwardly.

12. A soil-sampling apparatus comprising a stationary frame, a movable frame, means mounting said movable frame on said stationary frame for vertical movement, a tubular soil probe disposed in upright position, means mounting said probe on said movable frame for vertical movement, said probe having an elongated axially extending opening in one side thereof, means for dislodging soil cores from said probe as said probe moves upwardly, first power means mounted on said movable frame and connected to said probe for moving the latter vertically with respect to said movable frame, and second power means connected between said stationary and movable frames for moving said movable frame vertically with respect to said stationary frame.

References Cited

UNITED STATES PATENTS

| | | | |
|---|---|---|---|
| 120,836 | 11/1871 | Taylor | 175—84 X |
| 233,202 | 10/1880 | Cheney | 73—425 |
| 1,867,024 | 7/1932 | Oliver | 175—249 |
| 2,084,686 | 6/1937 | Howard | 173—141 X |
| 2,287,059 | 6/1942 | Platts et al. | 175—249 X |
| 2,643,858 | 6/1953 | Hardman | 175—249 X |
| 2,709,368 | 5/1955 | Wolpert | 175—162 X |
| 2,868,019 | 1/1959 | Bull | 175—162 |
| 2,956,782 | 10/1960 | Mistrot | 175—203 X |
| 3,054,285 | 9/1962 | Roosen | 175—19 X |
| 3,057,415 | 10/1962 | Cox | 175—249 X |
| 3,152,653 | 10/1964 | Sievers | 175—313 |
| 3,179,186 | 4/1965 | Bull | 175—162 X |
| 3,224,512 | 12/1965 | Alexander | 175—20 X |

FOREIGN PATENTS 419,187 9/1925 Germany.

CHARLES E. O'CONNELL, *Primary Examiner.*

I. A. CALVERT, *Assistant Examiner.*